Aug. 13, 1940.   E. KUENNING   2,211,135
LICENSE PLATE ATTACHMENT
Filed May 4, 1939
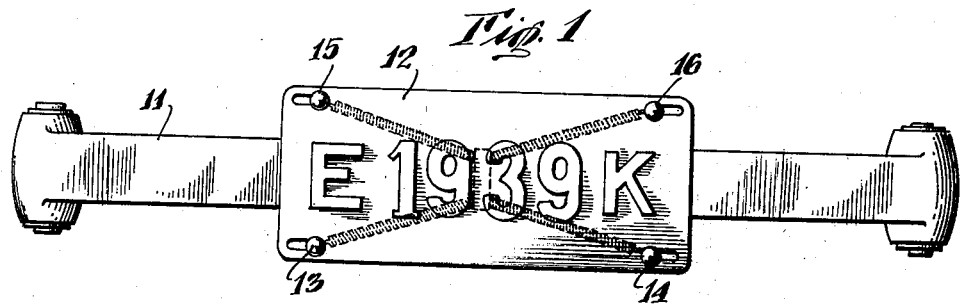
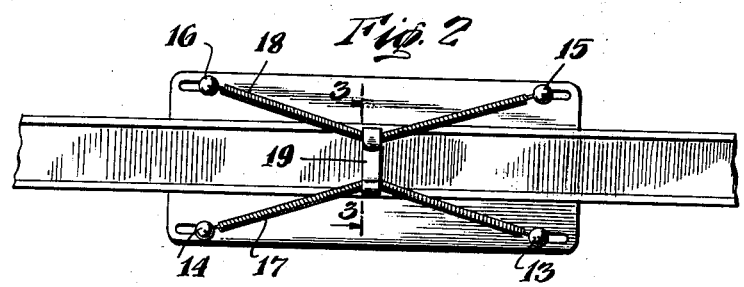
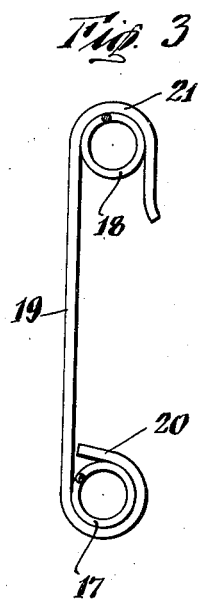 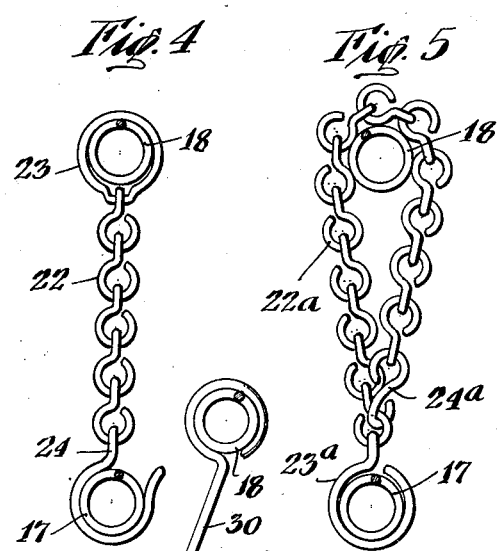 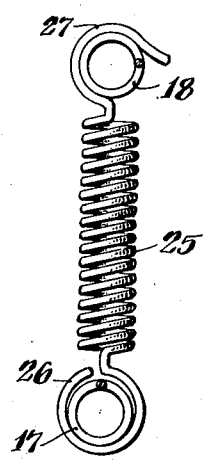
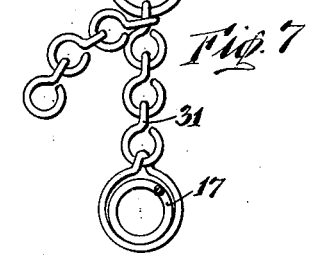
INVENTOR
Earl Kuenning
BY
ATTORNEYS Patented Aug. 13, 1940

2,211,135

UNITED STATES PATENT OFFICE 2,211,135

LICENSE PLATE ATTACHMENT

Earl Kuenning, New Bremen, Ohio

Application May 4, 1939, Serial No. 271,645

5 Claims. (Cl. 40—125)

This invention relates to license plate attachment, and it has for an object to provide means which are preferably permanently attached to a tag such as license number plates commonly used on motor vehicles, which means are so constructed that they may be readily and quickly applied to some suitable part of a vehicle such as the bumper bar or bars thus holding the license plate securely in place.

Another object is to provide such a device including resilient means whereby the license plate may be held firmly in place against rattling.

Another object is to provide such a device including a plurality of resilient means, each of which will in use partly surround the member to which it is applied, such as the bumper bar.

Another object is to provide such a device including adjustable means so that the license plate may be secured and firmly held in place on bumper bars or the like which vary greatly in width.

Further objects and advantages of this invention will be apparent from consideration of the specification as illustrated by the accompanying drawing of possible embodiments of the invention, in which drawing:

Fig. 1 shows a license plate of usual construction held in place upon a bumper bar, the holding device being shown in dotted lines;

Fig. 2 is a view of the same structure viewed from the other side;

Fig. 3 is an enlarged side view of the connecting element, as viewed for example along the line III—III of Fig. 2;

Figs. 4, 5, 6, and 7 represent modified forms of said connecting means.

Referring to said drawing, the numeral 11 indicates a bumper bar of conventional construction which may consist of one or a plurality of members and may vary considerably in total width. The numeral 12 indicates a license plate of usual or suitable construction. Passing through said license plate as through slots usually provided therein are the two fastening elements 13 and 14 which may be in the form of bolts, rivets, or any other suitable means. The numerals 15 and 16 indicate similar fastening means passing through holes near the upper edge of the license plate and preferably near the ends thereof. Extending between the fastening means 13 and 14 is a suitable elastic member such as the coil spring 17 firmly and relatively permanently attached thereto by means of said fastening elements 13 and 14. The numeral 18 designates a similar member, the ends of which are connected to the license plates by means of the fastening elements 15 and 16. Numeral 19 indicates a connecting member which may be formed of wire or of a metallic strip having an eye 20 formed at one end, thus causing it to be permanently attached to the elastic member 17. The other end of said connecting member is provided with a hook portion 21 which is shown in a position engaging the upper elastic member 18.

In use, the license plate may be readily and quickly detached from one vehicle and attached to another. This can be done by springing the elastic member 18 out of hook 21 and applying the plate to another vehicle where it is quickly attached by merely drawing the elastic members 17 and 18 together behind the bumper 11 and causing the member 18 to snap into place behind the hook 21; thus the license tag is firmly drawn against the front face of the bumper and the elastic members 17 and 18 are pressed firmly against the rear edge of the bumper. Rattling and chafing are thus avoided and in view of the strain to which the various parts are subjected it is impossible for the attaching device to open up and permit loss of the license plate. However, voluntary detachment can be effected almost instantaneously.

Such devices are very useful, particularly in the case of automobile salesmen who may be called upon to demonstrate to prospective purchasers a number of cars in quick succession. This can be accomplished with the use of the present invention whereas a change of plates involving even but a few minutes would frequently result in the departure of the prospective purchaser and the loss of the sale.

An important feature of the present invention is that all of the parts remain permanently attached to the license plate, even when the plate is not in position upon a vehicle. Therefore, the parts will always remain together, i. e., in proper relationship to each other and to the license plate assuring a constant readiness for use and insuring against loss.

Fig. 4 shows a modified form of construction in which a chain 22 is employed having permanently attached thereto a ring 23 surrounding the coil spring 18 and having at its other end a hook 24 for quick and detachable connection with the coil spring 17.

Fig. 5 shows a similar chain connecting device with the exception that the chain 22a has one end attached to the coil spring 17 by means of ring 23a and the chain passes around the coil spring 18 and has a hook 24a at its free end which may be hooked into any of the links of chain 22a, or for that matter, around the coil spring 18, thus providing adjustment in length of the connecting member so that the device may be used with a wide variety of bumpers or other supporting parts.

Fig. 6 shows a modified form in which the connecting member consists of a section 25 of coil spring or similar material having at one end an eye 26 surrounding one of the coil springs such as 17 whereas it is provided at its other end with a hook 27 capable of engaging the other coil spring such as 18. This form of construction has the advantage that it provides another resilient member so as to assure a maximum of resiliency and adjustability to adapt the device to bumpers and other supports of various widths.

Fig. 7 shows a further modified form of connecting means which is suitable for attaching the license plate to supports varying greatly in width, from the narrowest bumper or tie rod to the widest type of bumper or bumper and dust guard, or even around a spare tire. In this form of construction one of the elastic members, such as 18, is provided with a hook 30 permanently but oscillatably attached thereto. It will be noted that the hook portion thereof is sufficiently wide to embrace the other elastic member or coil spring 17 if desired, in which event the relation of the parts would be similar to that shown in Fig. 3. However, in order to provide for greater adjustment a chain 31 is provided preferably permanently attached to the coil spring 17. As shown in Fig. 7, the hook 30 passes through the desired one of the links of chain 31 so as to provide a wide range of adjustment.

The invention is not intended to be limited to the forms shown, which are to be understood as illustrative only and not as limiting, as various changes in construction and arrangement may be made, all coming within the scope of the claims which follow.

I claim:

1. In a device of the character described the combination comprising a license plate, a resilient supporting member adapted to extend generally longitudinally of said license plate, means for permanently attaching the ends of said member to said license plate, a second such longitudinally extending resilient member provided with means for permanently attaching it to said license plate and means detachably connecting said resilient members near the middle thereof.

2. In a device of the character described the combination comprising a license plate, a resilient supporting member adapted to extend generally longitudinally of said license plate, means for permanently attaching the ends of said member to said license plate, a second such longitudinally extending resilient member provided with means for permanently attaching it to said license plate and a member connected to each of said resilient members near the middle thereof, said connecting member being permanently attached at one end to one of said resilient supporting members and having means at its other end for temporary attachment to the other resilient supporting member.

3. In a device of the character described the combination comprising a license plate, a resilient supporting member adapted to extend generally longitudinally of said license plate, means for permanently attaching the ends of said member to said license plate, a second such longitudinally extending resilient member provided with means for permanently attaching it to said license plate and a member connected to each of said resilient members near the middle thereof, said connecting member comprising a chain having a hook attached to one end.

4. In a device of the character described the combination comprising a license plate, a resilient supporting member adapted to extend generally longitudinally of said license plate, means for permanently attaching the ends of said member to said license plate, a second such longitudinally extending resilient member provided with means for permanently attaching it to said license plate and a member connected to each of said resilient members near the middle thereof, said connecting member comprising a coil spring having means at one end for permanently attaching it to one of said resilient supporting members and having a hook at its other end for embracing the other resilient supporting member.

5. In a device of the character described the combination comprising a license plate, a resilient supporting member adapted to extend generally longitudinally of said license plate, means for permanently attaching the ends of said member to said license plate, a second such longitudinally extending resilient member provided with means for permanently attaching it to said license plate and a member permanently connected to one of said resilient members near the middle thereof and having a hook portion, and a chain permanently attached to the second mentioned resilient supporting member the links of which are adapted to be engaged by said hook.

EARL KUENNING.